Patented Jan. 9, 1934

1,942,407

UNITED STATES PATENT OFFICE 1,942,407

EMBALMING PREPARATION

William C. Black, Denver, Colo., assignor of one-half to Chauncey G. Wilson, Denver, Colo.

No Drawing. Application March 19, 1932
Serial No. 600,055

2 Claims. (Cl. 27—22)

My invention relates to embalming preparations, and particularly to a preparation adapted to decolorize discolored tissues of a deceased body, which is a desirable cosmetic result.

An important object of the invention is to decolorize bile stained tissues. Heretofore this has been difficult, if not impossible, to do by any known method, especially in severe cases. The present invention will effect this change.

Other objects reside in the simplicity of the present invention, of the method of producing the present composition, and of the method of its use. Still other objects will appear in the course of the following description.

I carry out the foregoing objects by injecting into a human corpse that is discolored by bile or other pigment, a substance or compound adapted to chemically combine with the pigment and to produce a colorless compound. The injection may be made intra-arterially, and/or intravenously.

While it is to be understood that I do not limit myself to these exact proportions, nevertheless the following formula has been found to produce satisfactory results:

| | |
|---|---|
| Benzoyl peroxide | 15 grams |
| Ethyl alcohol | 3 gallons |
| Formalin | 4 pints |
| Water | 1½ gallons |
| | 5 gallons |

The ethyl alcohol is preferably 95% pure, and the formalin, or commercial formaldehyde, is preferably a 40% solution. The water is distilled or reasonably pure.

The benzoyl peroxide is first dissolved in the ethyl alcohol. With the proportions given, there will be an excess of the benzoyl peroxide. The formalin is then added, and lastly the water.

When the present compound is injected as stated, a colorless compound is produced by a chemical reaction of the bile pigment and the benzoyl peroxide.

The alcohol has two main functions, to wit, (1) it acts as a solvent for the benzoyl peroxide; and (2) it acts as a solvent for the compound resulting from the chemical combination of the benzoyl peroxide and the bile pigment. The formalin has desirable preservative qualities.

In carrying out my invention, the bile decolorizing reagent (benzoyl peroxide in alcohol) may be injected as stated, either before or after ordinary embalming fluids, or may be mixed with such embalming fluids. Upon injecting the reagent, the bile pigment is dissolved and the tissues left colorless. The injections may be repeated if desired.

This invention provides a desirable and effective composition for decolorizing stained tissues; e. g., the tissues of a person who had a jaundice condition at the time of death.

It is to be understood that changes may be made in the details of my invention without departing from the spirit and scope of same, as stated in the hereunto appended claims.

What I claim and desire to secure by Letters Patent is:

1. An embalming fluid for jaundiced bodies comprising a solvent fluid distributer capable with respect to volume and fluidity, of diffusion over a comparatively wide region of a body from a point at which the distributer is injected into the body, and benzoyl peroxide held in solution in the distributer.

2. An embalming fluid for jaundiced bodies comprising a solvent fluid distributer capable with respect to volume and fluidity, of diffusion over a comparatively wide region of a body from a point at which the distributer is injected into the body, and benzoyl peroxide in a comparatively small volume held in solution in the distributer.

WILLIAM C. BLACK.